US006836047B1

(12) United States Patent
Leijon

(10) Patent No.: US 6,836,047 B1
(45) Date of Patent: Dec. 28, 2004

(54) ELECTRIC MACHINE WITH LOW EDDY CURRENT LOSSES

(75) Inventor: Mats Leijon, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/926,615

(22) PCT Filed: May 25, 2000

(86) PCT No.: PCT/SE00/01059
§ 371 (c)(1),
(2), (4) Date: Mar. 8, 2002

(87) PCT Pub. No.: WO00/74212
PCT Pub. Date: Dec. 7, 2000

(30) Foreign Application Priority Data

May 27, 1999 (SE) .............................................. 9901913

(51) Int. Cl.[7] .......................... H02K 3/40; H02K 3/34; H01B 7/30
(52) U.S. Cl. ...................... 310/198; 310/184; 310/196; 174/DIG. 20; 174/DIG. 28
(58) Field of Search ................................ 310/179–180, 310/184, 195–196, 198, 208; 174/DIG. 13–16, DIG. 19–22, DIG. 26–29

(56) References Cited

U.S. PATENT DOCUMENTS

| | | | |
|---|---|---|---|
| 3,487,455 A | * 12/1969 | Laurell et al. ........ | 174/102 SC |
| 3,676,814 A | * 7/1972 | Trunzo et al. ............... | 336/205 |
| 3,820,048 A | 6/1974 | Ohta et al. ...................... | 336/70 |
| 4,326,181 A | 4/1982 | Allen ............................ | 336/12 |
| 4,549,042 A | * 10/1985 | Akiba et al. ............ | 174/114 R |
| 4,552,990 A | 11/1985 | Persson et al. ......... | 174/117 FF |
| 4,663,603 A | 5/1987 | van Riemsdijk et al. ..... | 336/60 |
| 5,175,396 A | 12/1992 | Emery et al. .................. | 174/36 |

FOREIGN PATENT DOCUMENTS

| | | | | |
|---|---|---|---|---|
| GB | 468827 | * | 7/1937 | |
| WO | 97/45930 | * | 12/1997 | ............ H02K/3/40 |

* cited by examiner

*Primary Examiner*—Burton Mullins
(74) *Attorney, Agent, or Firm*—Oblon, Spivak, McClelland, Maier & Neustadt, P.C.

(57) ABSTRACT

A rotating electric machine having a magnetic circuit which in one of the parts of a rotor and a stator of the machine comprises an element (1) having a slot for a winding of layers (14, 16) of cables (9) extending substantially axially and arranged substantially radially outside each other, said cables comprising an inner conductor (10) comprising a plurality of strands (13) and an insulation (11) arranged outside thereof, has a larger share of strands of the cables closest to the other part of the rotor and the stator electrically insulated (15) with respect to each other than in the cables in the cable layer (16) most far away from said other part.

35 Claims, 3 Drawing Sheets

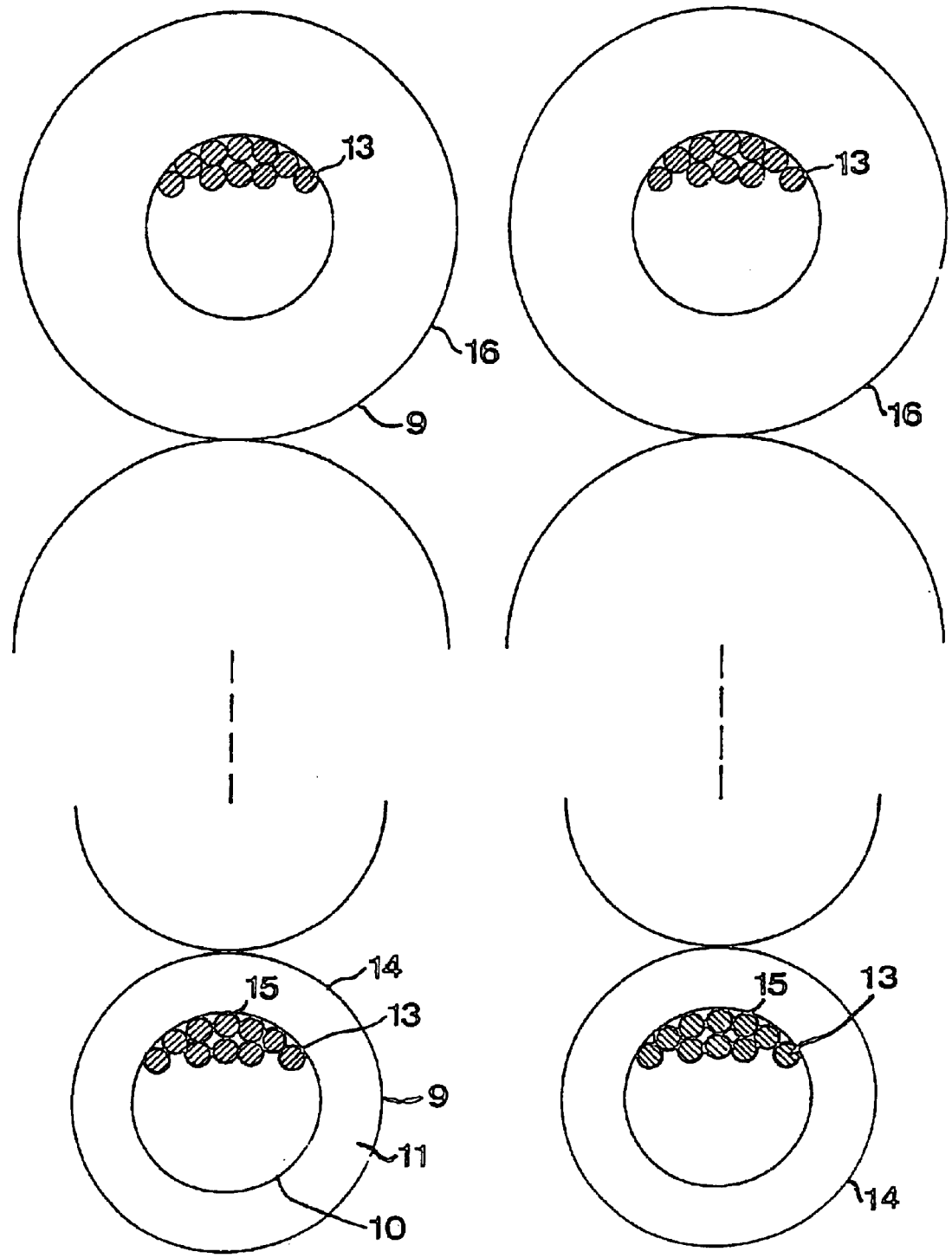

ELECTRIC MACHINE WITH LOW EDDY CURRENT LOSSES

FIELD OF THE INVENTION AND PRIOR ART

The present invention relates to a rotating electric machine having a magnetic circuit which in one of the parts of a rotor and a stator of the machine comprises an element having a slot for a winding having layers of cables extending substantially axially and arranged substantially radially outside each other, said cables comprising an inner conductor comprising a plurality of strands and an insulation externally thereof.

All types of rotating electric machines of the type with winding of a cable are comprised, i.e. such machines in which there is an insulation sheet around the conductor and the conductor is formed by a bundle of strands. All voltage ranges, high voltage as well as intermediate voltage and low voltage are comprised.

The element in the magnetic circuit with a slot for the cables may as mentioned be arranged in any of the parts: rotor and stator, of the electric machine. "Slot" is here to be given a broad sense and does not necessarily mean that this is so narrow that the element alone keeps the cables in place.

The electric machine may be arranged to function as generator and/or motor. For the purpose of example it may be mentioned that the machine could be a synchronous machine used as generator for connection to distribution and transmission networks or as motor or for phase compensation and voltage regulation. Other types of machines, such as asynchronous alternating current machines are also conceivable.

The element has a design allowing an alternating magnet flux therein, and it is preferably but not necessarily formed by a magnetic core of laminated sheet being normal or oriented, i.e. thin sheets being mutually insulated, for example through an insulation lacquer so as to keep the eddy current losses in the element on an acceptable low level.

A rotating electric machine of the type defined in the introduction is for example known through WO 97/45919 of the applicant, and it is schematically illustrated in the appended FIG. 1 how an electric machine of that type may be constructed. The element 1 of the magnetic circuit is in this case formed in the stator 2. The rotor with two rotor poles 3, 4 shown (it will in the practice have more, for example four) is designated by 5. The element 1, or actually the stator, is In a conventional way composed by a laminated core of electric sheet successively composed by sector-shaped plates. The number of teeth 7 extends from a back portion 6 of the core located radially outermost radially inwardly towards the rotor. A corresponding number of slots 8 are arranged between the teeth. The slots receive a winding of layers of cables 9 extending substantially axially and arranged radially outside each other. The cables 9 comprise an inner conductor 10 consisting of a plurality of strands and an insulation 11 arranged outside thereof. Since we speak about a high voltage generator and the voltage of the cable layers increases with the distance from the rotor through the connection made here the insulating layers get thicker in the direction away from the rotor. As a consequence of the limited availability of suitable cable dimensions no continuous- decrease of the cable insulation towards the rotor has taken place, but cables having three different dimensions of the cable insulation are used, such as for example for 70 kV, 100 kV and 130 kV.

It is illustrated in FIG. 3 how the magnetic alternating flux generated in the teeth 7 of the element 1 upon rotation of the rotor extends around the cables arranged in the slot 8 in question. A stray flux will as illustrated by dashed lines 12 be created through the conductors in an attempt of the magnetic flux to make a shortcut. This stray or leak flux involves some inconveniences. Firstly, the main flux is reduced therethrough, which results in a somewhat lower power of the electric machine. Furthermore, the stray flux will generate eddy currents in the strands, which results in heat generation and a demand of cooling the cables, which normally takes place indirectly by cooling the sheet package surrounding them. The strands have been electrically insulated from each other for reducing the eddy current losses, so that the magnetic flux experiences thin surfaces when intersecting the conductors of the cables and thereby the eddy currents and accordingly the eddy current losses will be low. However, this means that the conductors and thereby the cable will be considerably more expensive than if the strands had been uninsulated, and the insulation is usually achieved by painting the strands with an insulating lacquer, which means a load on the environment.

SUMMARY OF THE INVENTION

The object of the present invention is to provide a rotating electric machine of the type defined in the introduction, in which at least the disadvantage last mentioned of such machines already known has been substantially reduced.

This object is according to the invention obtained by the fact that in such a rotating electric machine a larger share of the strands of the cables closest to the other part of the rotor and the stator are electrically insulated with respect to each other than of the cables most far away from the other part.

Thus, the invention utilizes the understanding that the magnitude of the stray or leak flux through the respective cable depends upon the relationship between the flow path closed through the cable and the alternative flow path around the cables, which means that the stray flux decreases for each cable layer in the direction away from the rotor. It has turned out that it is therefore possible to allow considerably larger continuous surfaces in the cable conductors intersected by the magnetic flux farther away from the rotor than closer thereto and thereby larger eddy current loops, since the stray flux is in any way so much lower that the eddy current losses in the conductors are kept on an acceptably low level. By electrically insulate fewer strands with respect to each other in the cables most far away from the other part, in the case discussed above the rotor, than in the cables closer to this other part, considerable costs may be saved. The costs of a strand with an insulation are normally in the order of twice the costs of a strand without insulation. Furthermore, it is when using an insulating lacquer for the insulation in this way possible to spare the environment by a considerably reduced consumption of lacquer when manufacturing the cable. Accordingly, the Invention is based on the idea to concentrate on reducing eddy current losses where it is mostly needed, i.e. where the leak or stray flux is the highest.

According to a preferred embodiment of the invention substantially all strands are electrically insulated with respect to each other in the cable layer closest to said other part, which is advantageous, since the leak flux is there the highest and the need to keep the surfaces experienced by this leak flux down on a low level is then also the greatest.

According to another preferred embodiment of the invention substantially none of the strands are electrically insulated with respect to the rest of the strands in the cable layer located most far away from said other part. Such an advantageous design of the cable in said cable layer is in fact possible, since the leak flux of that cable layer is very low thanks to the short extra way to go for the main flux around the cable layer in the element with a considerably higher magnetic reluctance.

According to another preferred embodiment of the invention the share of strands electrically insulated with respect to the rest of the strands of the cable decreases in the direction away from said other part. The advantages mentioned above of a lack of electric insulation of the strands with respect to each other where it is in fact not needed is hereby obtained. According to other preferred embodiments of the invention said decrease may take place for each cable layer in the direction away from said other part or stepwise after two or more cable layers having the same proportion or share of strands being electrically insulated with respect to each other in the direction away from said other part.

According to another preferred embodiment of the invention the electrical insulation of the strands with respect to each other is obtained by providing the respective insulated strand with an insulating thin envelope surrounding the strand, which according to an embodiment is formed by an insulating lacquer. According to another embodiment the electrical insulation of the strands with respect to each other is obtained by making such electrically insulated strands of aluminium, the surface of which is allowed to oxidate for forming an aluminium oxide layer surrounding the strand. It is in this way possible to do without the insulating lacquer undesirable from the environmental point of view, and aluminium may then advantageously be used for the strands requiring an electrical insulation with respect to each other and for example copper of the strands with no need to be electrically insulated with respect to each other. Thus, the cable or cables most far away from said other part could advantageously have a conductor formed by strands of copper uninsulated with respect to each other, while the cables closest to the other part could have the conductor thereof formed by strands of aluminium. Accordingly, in the case discussed above of a high voltage generator the 70 kV-cables could for example have strands of aluminium, while the 100 kV-cables could have strands of copper.

According to another preferred embodiment of the invention said winding is at least partially formed by a cable in the form of a flexible electric conductor having an envelope able to confine the electric field generated around the conductor. This enables a reduction of electric losses, which in its turn results in a lower temperature of the cable and the surrounding element, which reduces the need of cooling and makes it possible to construct cooling arrangements possibly existing in a more simple way than without such a design of the cable. The cable may be made in the form of a flexible cable, which means substantial advantages with respect to manufacturing and mounting compared to rigid windings prefabricated and traditionally used until today. Furthermore, the use results in an insulation system with an absence of gaseous and liquid insulating material with the disadvantage adhered thereto obtained in this way.

Further advantages as well as advantageous features of the invention appear from the other dependent claims and the following description.

BRIEF DESCRIPTION OF THE DRAWINGS

With reference to the appended drawings, below follows a specific description of preferred embodiments of the invention cited as examples.

In the drawings:

FIGS. 6 and 7 are enlarged detail views of the innermost and the outermost cable layer in a rotating electric machine of the type shown in FIG. 1 according to a first and a second preferred embodiment of the invention, respectively.

DETAILED DESCRIPTION OF PREFERRED EMBODIMENTS OF THE INVENTION

Figure 1:
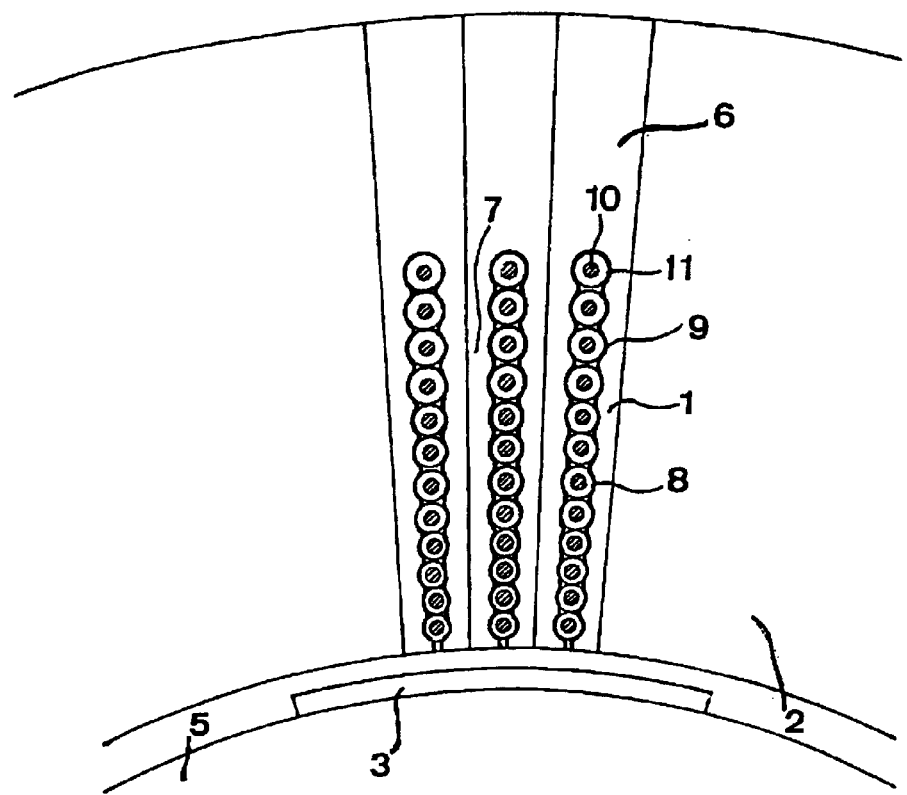
FIG. 1 is a simplified axial end view of a rotating electric machine of the type according to the invention.
Figure 1:
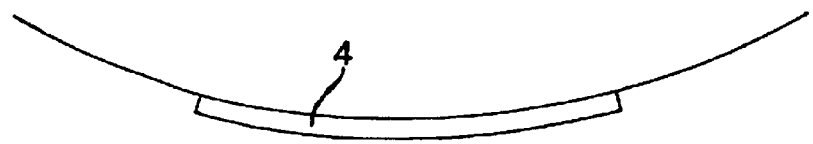
Figure 2:
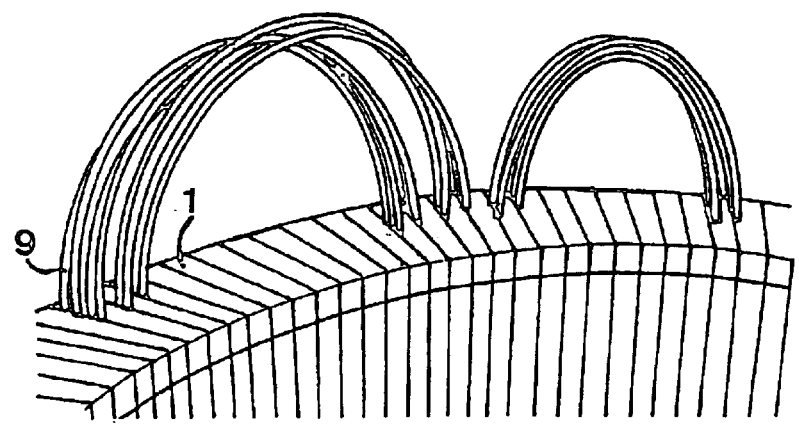
FIG. 2 is a perspective view of a part of one end of the stator of the electric machine according to FIG. 1 during the manufacturing phase thereof.
Figure 3:
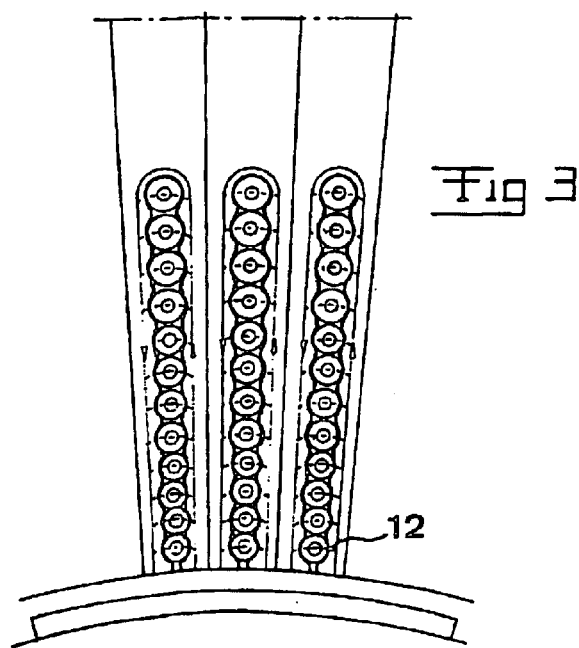
FIG. 3 is a detail view of a part of the machine according to FIG. 1 illustrating the magnetic flux paths.

It is firstly illustrated in FIG. 2 how the cables 9 are arranged in the slots in the element 1 by threading them thereinto. All cables are not yet in place here.

Figure 4:
FIG. 4 is a graph showing the leak magnetic flux through a cable according to FIG. 3 in function of the radial distance of the cable from the rotor.

It is illustrated in FIG. 4 how the leak flux B decreases for each position P of the cable 9 away from the rotor, i.e. with increasing distance from the rotor. The explanation thereto is that the relationship between the leak flux path and the alternative path for the magnetic flux through the element 1 around the cable layer increases continuously.

It is illustrated in FIG. 6 how this understanding has resulted in a first preferred embodiment of the invention, in which the strands 13 (the entire conductor 10 is of course filled by strands, even if the figures show other things for the sake of simplicity) of the cable layer 14 located closest to the rotor are electrically insulated with respect to each other through a thin insulating layer 15 surrounding each strand, which may be of a conventional insulating lacquer. This is important for keeping the eddy current losses on a low level, since the leak flux is the highest there. However, the strands 13 of the cable layer 16 located most far away from the rotor are not electrically-insulated with respect to each other, which is possible since the leak flux there is so low that the eddy current losses are still kept on an acceptably low level. It is by this possible to save financial as well as environmental resources. The strands of the outermost cable may namely be obtained to nearly half the cost with respect to the strands of the innermost cable. It is possible to design the cables between the two extreme cable layers 14, 16, so that the share or proportion of strands electrically insulated with respect to each other decreases for each cable layer or stepwise after two, three or the like subsequent cable layers having the same proportion of insulated strands in the direction away from the rotor. However, it is also possible to have for example all strands electrically insulated with respect to each other for a certain number of cable layers, for example half or two thirds thereof, and then have all strands uninsulated for the rest of the cable layers.

A second preferred embodiment of the invention is illustrated in FIG. 7, which differs from the one according to FIG. 6 by the fact that the electrical insulation of the strands with respect to each other has been obtained by using aluminium as material for the strands and allowing the surface the strands to oxidate for forming an aluminium oxide layer 15 surrounding the respective strand. In the case that the strands have not been insulated copper have been used for the strands, since this is more advantageous through the higher electrical conductivity of copper. Thus, as shown in this Figure, all strands of the innermost cable layer may be of aluminium, while the strands of the outer cable layer 16 are made of copper. The advantage of proceeding in this way for obtaining the electrical insulation of the strands with respect to each other where this is found to be necessary is that the insulating lacquer unpleasant from the environmental point of view does not have to be used. Costs for the strands, especially for the one of copper, are simultaneously saved in the same way as in the embodiment according to FIG. 6.

Figure 5:
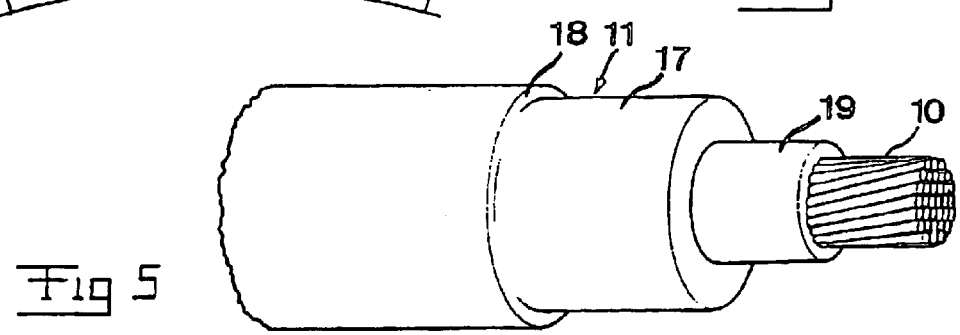
FIG. 5 is a view illustrating the construction of a cable particularly suited to be used in a rotating electric machine of the type according to the invention.

Finally, the construction of a cable of the type particularly well suited to be used in a rotating electric machine of the type according to the invention at high voltages is illustrated in FIG. 5, especially in a high voltage generator according to WO 97/45919 discussed further above. This cable has an inner electric conductor 10 with an envelope 11 able to confine the electric field generated around the conductor. This cable has an inner flexible electric conductor 10 and an envelope 11 forming an insulation system, which comprises an insulation 17 formed by a solid insulation material, preferably a material on polymeric basis, and an outer layer 18 having an electrical conductivity being higher than the one of the insulation so that the outer layer through connection to ground or otherwise to a comparatively low potential will be able to on one hand operate to equalize potential and on the other primarily enclose the electric field created as a consequence of said electric conductor 10 interiorly of the outer layer 18. Furthermore, the outer layer should have a resistivity being sufficient for minimizing the electric losses in the outer layer. The insulation system also comprises an inner layer 19, which has said at least one electric conductor 10 arranged interiorly thereof and has an electrical conductivity being lower than the one of the electric conductor but sufficient for making the inner layer to operate for equalizing potential and thereby act equalizing with respect to the electric field outside the inner layer. Thus, such a cable is of a type corresponding to cables having a solid extruded insulation and today being used within power distribution, for example so called PEX-cables or cables with EPR-insulation. The term "solid insulation material" used means that the winding has to be without any liquid or gaseous insulation, for example in the form of oil. The insulation is instead intended to be formed by a polymeric material. Also the inner and outer layers are formed by a polymeric material, although a semiconducting one. The insulation 18 may be made of a solid thermoplastic material, such as low-density polyethylene (LDPE), high-density polyethylene (HDPE), polypropylene (PP), polybutylene (PB), polymetylpentene (PMP), cross-linked polyethylene (XLPE) or rubber such as ethylene-propylene rubber (EPR) or silicon rubber. With respect to the resistivity of the inner layer and the outer layer this should be within the range $10^{-6}$ Ωcm–100 kΩcm, suitably $10^{-3}$–1000 Ωcm, preferably 1–500 Ωcm. The inner and the outer layers have advantageously a resistance which per length meter of the conductor/insulation system is in the range 50μΩ–5 MΩ.

The electric load or stress on the insulation system is reduced as a consequence of the fact that the inner and outer layers of the semiconducting materials around the insulation will tend to form substantially equipotential surfaces and the electric field in the insulation will in this way be distributed comparatively homogeneously over the thickness of the insulation.

The adherence between the insulation material and the inner and outer semiconducting layers has to be uniform over substantially the entire interface thereof, so that no hollow spaces, pores and the like may be created. This is of course particularly important in high voltage applications, and a cable of this type has preferably an insulation system adapted for high voltage, suitably over 10 kV, especially over 36 kV and preferably over 72.5 kV. The electrical and thermal stresses occurring at such high voltages make high demands on the insulation material. It is known that so-called partial discharges, PD, is in general a severe problem for the insulation material in high voltage applications. Should hollow spaces, pores or the like be formed in an insulating layer, inner corona discharges may occur at high electric voltages, whereby the insulation material is gradually degraded and the result could be electrical breakdown through the insulation. This could result in a severe breakdown of the reactor.

It is advantageous that the inner and outer layers and the solid insulation have substantially the same thermal properties for avoiding the generation of such hollow spaces or pores, in which it is particularly important that they have substantially the same coefficient of thermal expansion, so that a perfect adherence between the different layers may be maintained during temperature changes thereof and the cable expands and contracts uniformly as a monolithic body upon temperature changes without any destruction or degradation of the interfaces. The insulation layer is for example a PEX-cable of cross-linked low-density polyethylene and the semiconducting layers of polyethylene with dust and metal particles admixed. Volume changes as a consequence of temperature changes are absorbed entirely as changes of the radius of the cable and thanks to the comparatively small difference of the coefficients of thermal expansion of the layers with respect to the elasticity of these materials, the radial expansion of the cable may take place while avoiding that the layers will get loose from each other.

The cable has also to have a certain flexibility, and it is flexible down to a radius of curvature below 25 times the diameter of the cable so that bending may take place while ensuring a good adherence between the respective layers and the solid insulation. The cable is suitably flexible to a radius of curvature below 15 times the diameter of the cable, and preferably to a radius of curvature below 10 times the diameter of the cable. The E-modulus of the different layers in the insulation system should be substantially equal so as to not induce any unnecessary shearing stresses in the interfaces between the different layers, so that a reduction of the shearing stresses that may be created between the different layers when exerting the cable to powerful bending resulting in tension stresses on the outside of the bend and compressive stresses on the inside of the bend may take place.

The invention is of course not in any way restricted to the preferred embodiments described above, but many possibilities to modifications thereof will be apparent to a man skilled in the art without departing from the basic idea of the invention as defined in the appended claims.

It would for example be well possible to use other materials than those mentioned above for electrically insulating the strands with respect to each other, and it would also be possible to imagine different combinations of electrical insulation therebetween, so that for example where the leak flux is not that high for example an electrically insulating layer is arranged around a smaller amount of strands, as for example three, for electrically insulating them with respect to another such bundle of strands and obtain a suitable restriction of the size of the surface experienced by the leak flux.

For making the electric machine described further above function at higher voltages it is essential that at least one strand of the cable is in electric contact with the inner semi-insulating layer for forming a equipotential surface, and "substantially all strands are electrically insulated with respect to each other" in the claims is intended to cover this case too.

What is claimed is:

1. A high voltage rotating electric machine comprising:
   a rotor;
   a stator having a slot; and
   a winding having a plurality of cable layers that each include an inner conductor with a plurality of strands and an insulation disposed about said inner conductor, said plurality of cable layers arranged substantially axially through said slot and substantially radially outside one another, wherein
   said plurality of cable layers includes an inner cable layer and an outer cable layer, said inner cable layer disposed in said slot radially closer to said rotor than said outer cable layer,
   a larger number of strands in said inner cable layer are electrically insulated from one another than strands in the inner conductor of said outer cable layer.

2. A high voltage rotating electric machine according to claim 1, wherein:
   said inner cable layer is an innermost cable layer with regard to a radial proximity to said rotor, and wherein substantially all of the plurality of strands of the innermost cable layer include an electrical insulation thereabout.

3. A high voltage rotating electric machine according to claim 1, wherein:
   said outer cable layer is an outermost cable layer with regard to a radial proximity to said rotor, and substantially none of the plurality of strands of the outermost cable layer include an electrical insulation thereabout.

4. A high voltage rotating electric machine according to claim 1, wherein:
   a portion of strands insulated from one another in the inner conductor of respective of the plurality of cable layers decreases on a cable layer by cable layer basis as a distance to the rotor increases.

5. A high voltage rotating electric machine according to claim 1, wherein:
   a portion of the plurality of strands configured to have an electrical insulation within each layer of the plurality of cable layers decreases as a distance to the rotor increases on a cable layer by cable layer basis.

6. A high voltage rotating electric machine according to claim 1, wherein:
   a portion of the plurality of strands configured to have an electrical insulation thereabout decreases as a distance to the rotor increases by two or more layers of the plurality of cable layers, where said distance is on a cable layer by cable layer basis.

7. A high voltage rotating electric machine according to claim 1, wherein:
   a plurality of slots are arranged in the stator.

8. A high voltage rotating electric machine according to claim 1, wherein:
   a circuit formed between the stator and rotor is configured for high voltage operation;
   the plurality of cable layers are configured to have an electric potential developed therein that increases as a distance between the winding and the rotor increases; and
   an insulation thickness of the insulation decreases in at least one of a continuous manner and a stepwise manner as a distance from the rotor increases on a cable layer by cable layer basis.

9. A high voltage rotating electric machine according to claim 1, wherein:
   a strand that is insulated in the inner cable comprises aluminum, and an insulation on the strand is an aluminum oxide.

10. A high voltage rotating electric machine according to claim 1, wherein:
    the insulation comprises a thin electrically insulating envelope.

11. A high voltage rotating electric machine according to claim 10, wherein:
    the thin electrically insulating envelope comprises an insulating lacquer.

12. A high voltage rotating electric machine according to claim 10, wherein:
    a portion of the plurality of strands in said inner cable layer that are insulated comprises aluminum and a portion of the plurality of strands in the inner cable layer that are uninsulated are comprised of copper.

13. A high voltage rotating electric machine according to claim 1, wherein:
    said inner cable layer being an innermost cable layer with regard to a radial proximity to said rotor, substantially all of the plurality of strands are comprised of aluminum; and
    said outer cable layer is an outermost cable layer with regard to a radial proximity to said rotor, substantially all of the plurality of strands comprises copper.

14. A high voltage rotating electric machine according to claim 13, wherein:
    the winding is configured to carry voltages greater than 10 kV.

15. A high voltage rotating electric machine according to claim 14, wherein:
    the winding is configured to carry voltages greater than 36 kV.

16. A high voltage rotating electric machine according to claim 15, wherein:
    the winding is configured to carry voltages greater than 72.5 kV.

17. A high voltage rotating electric machine according to claim 13, wherein:
    the winding is configured to be connected to a voltage greater than 10 kV.

18. A high voltage rotating electric machine according to claim 17, wherein:
    the winding is configured to be connected to a voltage greater than 36 kV.

19. A high voltage rotating electric machine according to claim 18, wherein:
    the winding is configured to be connected to a voltage greater than 72.5 kV.

20. A high voltage rotating electric machine according to claim 13, wherein:
    the winding comprises a flexible electric conductor and a casing configured to contain an electric field generated around the flexible electric conductor.

21. A high voltage rotating electric machine according to claim 20, wherein:
    the casing comprises an insulation system having an inner layer disposed on the flexible electric conductor, a solid insulation layer disposed on the inner layer, and an outer layer disposed on the solid insulation layer, wherein the outer layer is configured to have an electric conductivity higher than that of the solid insulation layer and is connected to a node having at least one of a ground potential and a low voltage potential so as to contain the electric field formed around the flexible electric conductor.

22. A high voltage rotating electric machine according to claim 21, wherein:
the inner layer is configured to have an electric conductivity lower than the flexible electric conductor and to substantially equalize an electric field formed on an outer surface of the inner layer.

23. A high voltage rotating electric machine according to claim 21, wherein:
the inner layer, the outer layer and the solid insulation layer are configured to have an essentially equal thermal characteristic.

24. A high voltage rotating electric machine according to claim 21, wherein:
the inner layer and the outer layer comprise a semiconductor material.

25. A high voltage rotating electric machine according to claim 21, wherein:
the inner layer and the outer layer are configured to have a resistivity in an inclusive range of $10^{-6}$ Ω–1000 Ωcm.

26. A high voltage rotating electric machine according to claim 21, wherein:
the inner layer and the outer layer are configured to have a resistivity in an inclusive range of $10^{-3}$ Ωcm–1000 Ωcm.

27. A high voltage rotating electric machine according to claim 21, wherein:
the inner layer and the outer layer are configured to have a resistivity in an inclusive range of 1 Ωcm–500 Ωcm.

28. A high voltage rotating electric machine according to claim 21, wherein:
the inner layer and the outer layer are configured to have a resistance in an inclusive range of 50 μΩ/m–5 MΩ/m.

29. A high voltage rotating electric machine according to claim 21, wherein:
the solid insulation layer and at least one of the inner layer and the outer layer comprise a polymeric material.

30. A high voltage rotating electric machine according to claim 21, wherein:
the solid insulation layer, the inner layer and the outer layer are configured to ensure adherence upon flexing and temperature change.

31. A high voltage rotating electric machine according to claim 21, wherein:
the solid insulation layer, the inner layer and the outer layer comprise materials with high elasticity.

32. A high voltage rotating electric machine according to claim 21, wherein:
the solid insulation layer, the inner layer and the outer layer are comprised of materials with a substantially equal E-modulus.

33. A high voltage rotating electric machine according to claim 21, wherein:
the solid insulation layer, the inner layer and the outer layer are comprised of materials with a substantially equal thermal expansion coefficients.

34. A high voltage rotating electric machine according to claim 21, wherein:
the inner layer is configured to be in electrical contact with the flexible electric conductor.

35. A high voltage rotating electric machine according to claim 21, wherein:
the flexible electric conductor comprises a plurality of strands, and
at least one portion of at least one of the plurality of strands is uninsulated and configured to be in contact with the inner layer.

* * * * *